Figure 1:
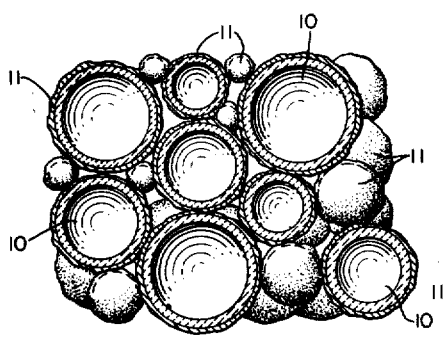

Sept. 17, 1957     F. A. BOZZACCO ET AL     2,806,509

SANDWICH STRUCTURES

Filed June 11, 1956

*INVENTOR.*
FRANCIS A. BOZZACCO
BY RAYMOND W. SHEATSLEY

ATTORNEY

United States Patent Office 2,806,509
Patented Sept. 17, 1957

2,806,509
SANDWICH STRUCTURES

Francis A. Bozzacco, Massillon, and Raymond W. Sheatsley, North Canton, Ohio, assignors to Goodyear Aircraft Corporation, Akron, Ohio, a corporation of Delaware Application June 11, 1956, Serial No. 590,615

23 Claims. (Cl. 154—28)

This invention relates to the fabrication of laminated sandwich panels and is particularly concerned with improvements in the core material contained between the confining skins.

Prior practices in the laminating field have been directed toward obtaining a combination of desirable characteristics, namely, maximum structural strength coupled with minimum density. In certain uses for laminated structures additional characteristics are essential, for example, fire resistance, good electrical properties, good insulating characteristics, and impact resistance.

Various attempts have been made to fabricate a structure embodying these desirable characteristics. Nevertheless, it has been customary to sacrifice strength to obtain low density or to sacrifice low density to obtain maximum strength. In certain desirable uses for laminated structures, the incorporation of these optimum conditions in a practical laminated structure has been impossible or impractical, as, for example, in the fabrication of radar canopies, guided missile parts, airplane components, and other specific uses.

It is, accordingly, an object of this invention to provide a structure characterized by the presence of a porous filler which combines maximum strength and minimum density.

It is another object of this invention to fabricate a laminate which resists thermal and structural distortion and which has good heat insulating characteristics. It is a further object of this invention to provide a method for preparing laminated sandwich panels having superior physical characteristics. It is still another object of this invention to provide a filler comprised of thin walled hollow beads coated with a powdered metal and a thermosetting resin. It is another object of this invention to provide a process for making a filler comprised of thin walled hollow beads coated with a powdered metal and a thermosetting resin. Additional objects will be obvious as the description of the invention proceeds.

In the practice of this invention, outer facing sheets, or skins, are prepared in the customary manner. Such sheets can be made from paper, sheet metal, wood, glass fiber laminates or other customary sheeting materials. The outer skins are generally selected in view of the use contemplated for the finished product. Woven glass fiber laminates, prepared by impregnating woven glass fiber sheets with a resin and curing the same under pressure according to customary practices, are preferred in the practice of this invention.

The laminated panels of this invention are prepared by placing a filler comprised of small thin walled hollow beads coated with a heat tackifiable resin and a powdered metal between the confines of outer skins and thereafter heating and compressing the entire assembly in order to compact the beads and to gel the resin.

In the practice of this invention, small thin walled substantially spherical beads are prepared in a conventional manner. These spherulized beads can be made from any composition which can be formed into the desired shape. It is known from U. S. Patent No. 1,995,-803 to prepare spherulized beads from fusible materials by passing them through a heating zone in a dispersed condition while suspended in a gaseous medium. It is also known from U. S. Patent No. 2,151,083 to form spherulized beads from silica gel by subjecting them to a very high temperature in the presence of a gas which is entrapped in the pores of the gel. A preferred process for the formation of beads from argillaceous material which are particularly useful in the practice of this invention is that described in U. S. Patent No. 2,676,892, wherein the argillaceous materials are finely divided and subjected to a high temperature while suspended in a gas to effect complete fusion of the particles while so suspended. Examples of compositions suitable for bead formation are aluminum oxide, sodium silicate, perlite, glass, various ceramic materials, the various clays and the various hard resins which may be either natural or synthetic, e. g. polystyrene. Because of ready availability, cheapness of the raw material and ease of forming into beads, clay is generally preferred for most uses.

Although size of the beads is not critical, for certain uses substantial uniformity of size is desirable. For most laminating uses, the thin walled hollow beads of this invention will normally range in size from about 5 mesh to 250 mesh, to wit, substantially all of the beads will pass through a U. S. standard 5 mesh screen and substantially none will pass through a 250 mesh U. S. standard screen. It has been discovered that beads ranging from 20 mesh to 100 mesh give the best results.

After the beads are prepared, they can be coated with a powdered metal and a thermosetting resin. The resin and powdered metal may be mixed prior to the coating, or the powdered metal can be mixed with the beads and thereafter mixed with the resin. Preferably, the beads and powdered metal are loosely mixed together and the resin added thereto from a solvent system. In this manner, greater uniformity of distribution of the powdered metal and the binding resin is insured. In the preferred practice, the solvent is removed and the coated beads are used.

Any of the normally solid polyvalent metals which can be powdered are useful in the practice of this invention. Any of the customary methods can be used for powdering the metals. The metals may be ground to a fine powder, or they may be prepared by attrition, or they may be prepared by precipitation such as electrical precipitation. Any of the other methods for preparing metal powders can be used in preparing the powders which are useful in the practice of this invention. It is desirable to obtain powdered metals wherein the maximum surface area per unit is obtained. Examples of metals which can be powdered are aluminum, iron, zinc, tin, magnesium, copper, tungsten, lead, antimony, cadmium, bismuth, gold and silver. Also, various alloys which can be powdered are useful in the practice of this invention. Examples of alloys are steel, bronze, brass, etc. The size of the particles of powdered metal is not critical except that the size of metal particles will always be substantially less than the size of the hollow beads. For best processing, the particle size will be quite small. Preferably, the size will range from about 250 mesh to 350 mesh, to wit, substantially all of the particles will pass through a 250 mesh U. S. standard screen and substantially none will pass through a 350 mesh U. S. standard screen.

The useful binding resins are thermosetting resins which are customarily mixed with the beads and powdered metal by means of a solvent system. Any of the known customary solvents can be used. Examples of suitable customary solvents are the aromatic solvents such as benzene, toluene, etc.; the aliphatic hydrocarbon solvents such as gasoline, kerosene, etc.; the alcohols such as methyl, ethyl, propyl, isopropyl, butyl, etc.; ethers such as diethyl, diphenyl ether, etc.; ketones such as methyl ethyl ketone, acetone, etc.

Any of the customary resins which are thermosetting or which can be rendered thermosetting by the addition of modifiers can be used in the practice of this invention. The useful thermosetting resins will range from liquids to solids at room temperature. For example, thermosetting silicone resins, epoxy resins, phenolic resins, polyesters resins, including the alkyd resins, and the various natural hard resins can be used in the practice of this invention.

The known silicone resins which are useful in the practice of this invention can be described as substituted compounds of silicon which normally contain silicon, oxygen and organic groups attached thereto. The silicone resins are polymeric materials having an organopolysiloxane molecular structure. These polymers are based on either a cross-linked or linear skeleton of alternate oxygen and silicon atoms. The attached organic groups may be alkyl or aryl.

The known epoxy resins which are useful in the practice of this invention can be described as the reaction products of polyphenolic compounds and epoxy compounds such as epichlorohydrin. Cross-linking with a catalyst forms the thermosetting polymers. Polymerization is normally induced by means of organic polyamines. Also, the epoxide resins can be copolymerized with various other types of resins such as urea formaldehyde, phenol formaldehyde and melamine formaldehyde. The epoxy resins may also be esterified with the various fatty acids and vegetable oil acids.

The known phenolic resins which are useful in the practice of this invention can be described as the reaction products of phenols and other reactive molecules. The more common phenolic resins are the phenol-aldehyde resins. The phenol may be any of the monohydric or polyhydric phenols such as phenol, cresol, xylenol, resorcinol, catechol, phloroglucinol, etc. The phenol may be condensed with any resin-forming aldehyde to yield a thermosetting resinous condensation product. The useful aldehydes include furfural, acrolein formaldehyde, acetaldehyde, butyraldehyde, etc.

The known polyester resins which are useful in the practice of this invention can be described as the condensation products of polybasic acids and polyols such as the glycols, glycerols, etc. The polyesters may be used in conjunction with the polyisocyanates to form polyurethane resins. Alkyd resins can be further described as the condensation products of polyhydric alcohols and polycarboxylic acids. Representative polyhydric alcohols which can be used in preparing alkyd resins for use in the practice of this invention are ethylene glycol, triethylene glycol, propylene glycol, 1,4 butene diol, dipropylene glycol, hexamethylene glycol, pinacol and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric, 2-phenylglutaric, citric, citraconic, mesaconic, itaconic, oxalic, malonic, glutaric, pimelic, suberic, azelaic and sebacic acids. It is possible to substitute ester-forming derivatives, such as the anhydrides, the simple esters and the like for the acids themselves. Also certain monofunctional modifiers can be incorporated in the resin according to the known art.

The sandwich structures of this invention can be prepared in the customary molds. The structures may be flat panels or curved panels or of any other configuration adaptable to customary molding techniques. In the customary practice, one of the mold members is lined with one of the confining skins. The treated thin-walled hollow beads are placed on the skin to a depth substantially thicker than the desired final sandwich structure. The opposite confining skin is then placed on top of the resin and metal coated beads. The opposite mold member is thereafter placed on top of the outer skin. In order to keep the top mold member from crushing some of the beads, small shims can be placed between the lips of the mold members in order to keep them spaced apart. The mold assembly containing the skins having the core material therebetween is then heated to a temperature sufficient to tackify the binding resin. The temperature will vary considerably depending upon the resin which is being used. It will normally range from about room temperature to about 250° F. When the resin is a silicone resin, the temperature required will be from about 175° F. to 225° F. The time required to tackify the resin will also depend upon the resin which is being used. The time will customarily be relatively short and usually will range from a few seconds to several minutes.

After the resin has become tacky, the shims can be removed from between the lips of the mold members and the mold members can be forced into position by means of pressure in order to compress the thin-walled hollow beads and in order to distribute the binding resin. The pressure required will customarily be a relatively low pressure and will customarily range from 5 to 75 pounds per square inch.

After the mold members have been locked in place, the entire assembly is heated to further distribute the binding resin and to set the resin. The time and temperature required for this operation will vary considerably depending on the thermosetting resin which is used to bind the core material. Customarily, the temperature required will range from about 150° F. to 500° F., and the time required will be a function of the temperature. Normally, the time required for some resins may be as short as 5 minutes and for some resins may be as long as 5 hours. Some resin may be post-cured for 3 or 4 days for best results. When the binding resin used is a thermosetting silicone resin, the temperature can be about 300° F. for a period of 2 to 3 hours followed by a temperature of about 500° F. for an additional period of about 3 to 4 hours.

The density of the finished product will normally be from about 25 to 75 pounds per cubic foot and will depend upon the resin used as the binding resin and the proportion of beads to resin. The weight ratio of beads to resin can range from 10:90 to 50:50. The proportion of powdered metal to resin can range from about 3 to 50%, based on the weight of resin and will preferably be from about 7 to 15%, based on the weight of resin. Obviously, the amount of metal will be determined somewhat by the use contemplated for the finished product. Where lightweight materials are desired and some strength can be sacrificed, the resin used in preparation of the core material can be modified to include a foaming ingredient. Any of the customary foaming materials can be used such as carbon dioxide releasing agents such as monovalent metal carbonates, the nitrogen releasing foaming agents such as hexamethylenetetramine and dinitrosopentamethylenetetramine and the various isocyanate blowing agents.

Where the maximum structural strength is desired, the sandwich structures of this invention may be comprised of a multiplicity of cores confined by spaced apart skins. Obviously, the inner skins would serve as confining structures for the opposite sides of two different cores.

Figure 2:
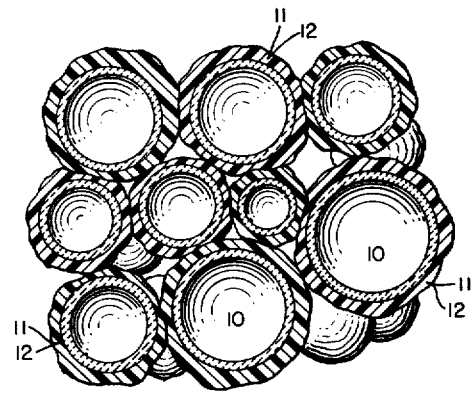
Figure 3:
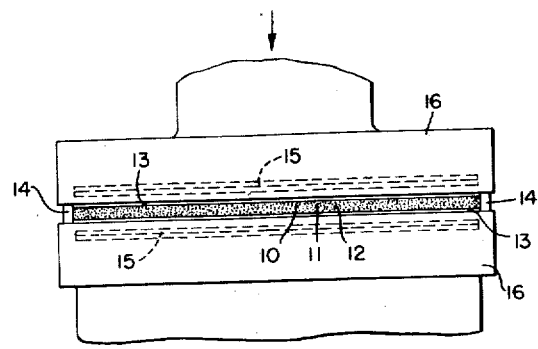
Figure 4:
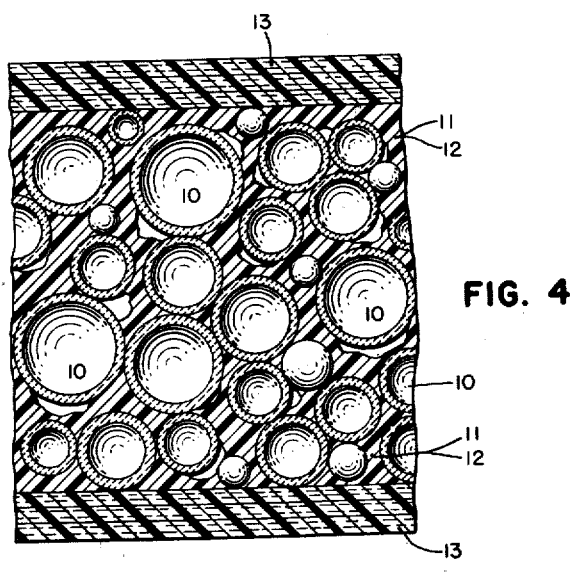

The invention can be more fully understood from the accompanying drawing wherein Fig. 1 is a cross-section of the hollow thin-walled beads coated with and intermingled with the powdered metal; Fig. 2 is a cross-section of the hollow beads coated with the mixture of powdered metal and binding resin; Fig. 3 illustrates one embodiment of a press suitable for the production of flat panels according to the practice of this invention and Fig.

4 is a cross-section of a laminated sandwich panel prepared according to the practice of this invention.

Thin-walled hollow beads 10 can be made according to customary practices described hereinabove. The beads can be loosely blended with a powdered metal 11 according to the above description. The mixture of beads and powdered metal can be mixed with a thermosetting resin in the liquid state. Customarily, the resin is a hard resin which has been dissolved in a suitable solvent prior to use. Non-fully equivalent results are obtained by mixing the powdered metal and resin prior to coating the beads. The beads 10 coated with the powdered metal and resin 12 are placed between the confines of outer confining skins 13 and held in place by confining shims 14. The resin and metal coated beads are thereafter added in an amount substantially greater than that required for the ultimate sandwich panel thickness desired. The loosely confined beads coated with the powdered metal and resin are heated between heating elements 15 to a temperature sufficient to tackify the resin being used as the binder and the mold members 16 are compressed to the limits of the confining shims in order to compress the beads and distribute the resin. Thereafter the temperature of the press is elevated to a temperature sufficient to set the thermosetting resin. Obviously, any customary heating means can be employed in the practice of this invention such as electrical heating elements, high pressure steam, radiant heat, etc.

The practice of this invention can be used in the preparation of any structures adaptable to sandwich panel construction. Examples of such structures are insulating panels, prefabricated house sections, fabrication of airplane and guided missile components such as radar canopies, nose structures, etc.

This invention is further illustrated by the following examples which are not intended to be limitations on the scope of the invention.

Example 1

A core composition was prepared from the following materials:

| | Grams |
|---|---|
| Kanamite Inorganic Hollow Beads [1] | 718.0 |
| Silicone Resin [2] | 215.4 |
| Aluminum Powder [3] | 38.0 |

[1] Small unicellular spherulized clay hollow beads made according to U. S. Patent 2,676,892 having a density of about 29.0 pounds per cubic foot and ranging in size from about 30 mesh to about 80 mesh.
[2] An alkylated thermosetting silicon resin having a melting point of 230° F. to 300° F., a specific gravity of about 1.17 and containing a small amount of lead oxide.
[3] Small aluminum particles, 98% of which will pass through a 325 mesh U. S. standard screen.

The hollow beads were mixed with the aluminum powder. Thereafter, the silicone resin, dissolved in about 215 grams of acetone, was slowly added from a dropping funnel into the mixture of hollow beads and aluminum powder. The acetone was completely evaporated by blowing air into the mixture while agitating the mixture. This produced dry, hollow beads which were uniformly coated with a mixture of the silicone resin and aluminum powder. The coated beads remained storage stable and free flowing.

Example 2

A core material was prepared according to the process of Example 1 and was comprised of the following ingredients:

| | Grams |
|---|---|
| Kanamite Hollow Beads | 718.0 |
| Phenolic Resin [1] | 143.6 |
| Aluminum Powder | 43.0 |

[1] A thermosetting phenol formaldehyde resin having a softening point ranging from 99 to 106° C., a nitrogen content ranging from 3.30 to 3.80 and a particle size not larger than 200 mesh.

The coated beads of this example also remained storage stable and free flowing.

Example 3

A core material was prepared from the following materials.

| | Grams |
|---|---|
| Kanamite Hollow Beads | 718.0 |
| Epoxy Resin [1] | 101.0 |
| Aluminum Powder | 29.0 |

[1] A viscous liquid epoxy resin possessing terminal epoxide groups having a Gardner-Holdt viscosity of 150 poises, an epoxide value of 175 to 210 equivalents per 100 grams and an ester value of 85 equivalents per 100 grams.

The process of Example 1 was used except the epoxy resin, being a viscous liquid, was mixed directly with the mixture of hollow beads and aluminum powder. This product also remained free flowing and storage stable.

Example 4

A core material was prepared as in Example 1 from the following ingredients:

| | Grams |
|---|---|
| Kanamite Hollow Beads | 718.0 |
| Silicone Resin [1] | 215.4 |
| Aluminum Powder | 38.0 |

[1] An alkylated silicon thermosetting silicone resin having a melting point of 230° F. to 300° F. and a specific gravity of 1.17.

The coated beads of this example also remained storage stable and free flowing.

Example 5

A test sandwich panel was constructed in the following manner. Laminated fiber glass skins were prepared by impregnating three plies of woven fiber glass with the silicone resin defined in Example 1 and curing the impregnated fiber glass under pressure at 350° F. for two hours. The laminated skins were coated on the core sides with the resin-acetone solution defined in Example 1. A 12" x 12" section of coated impregnated fiber glass skin was placed on a mold member, and ⅜" shims were placed around the periphery of the section. Thereafter, the coated beads of Example 1 were poured onto the skin and heaped up to a height substantially greater than the width of the shims. Another 12" x 12" section of coated impregnated fiber glass skin was placed upon the core material and the upper mold member placed on top of the upper skin. This assembly was heated briefly at a temperature of 225° F. in order to tackify the silicone resin. After the resin had become tacky, a pressure of about 15 pounds per square inch was applied to the upper mold member in order to compress the hollow beads and uniformly distribute the binding resin. After the confining skins were forced into adjacent relationship with the shims, the mold assembly was locked together, and the resin was gelled by curing at a temperature of 350° F. for three hours followed by heating at a temperature of 480° F. for about ten hours. The sandwich panel had a very uniform density and withstood a compression of about 2,000 pounds per square inch before breaking.

Example 6

A sandwich panel was prepared according to the process defined in Example 5 except that the fiber glass skins were impregnated with a phenolic resin, and the core material was the composition defined by Example 2. This panel also gave a uniform density and withstood a compression in excess of 5,000 pounds per square inch without breaking.

Example 7

A sandwich panel was prepared according to the process defined in Example 5 except that the fiber glass skins were impregnated with the epoxy resin defined in Example 3, and the core material was the composition defined by Example 3. This panel had a uniform density and withstood a compression of about 2,000 pounds per square inch without breaking.

Example 8

A sandwich panel was prepared according to the process defined in Example 5 except that the fiber glass skins were impregnated with the silicone resin defined in Example 4, and the core material was the composition defined by Example 4. This panel also had a uniform density and withstood a compression of about 1,500 pounds per square inch without breaking.

Small ellipsoid radomes having a diameter at the base of about 10" and a height of about 27" were prepared according to Examples 5 through 8. These radomes, in addition to having great uniformity of density and being able to withstand considerable compression, also had very fine dielectric properties and were substantially electrically transparent, to wit, radar waves could pass through the radomes without noticeable deviation and without diminishing the intensity of the waves.

While certain representative embodiments and details have been shown for the purpose of illustrating the invention, it will be apparent to those skilled in this art that various changes and modifications may be made therein without departing from the spirit or scope of the invention.

We claim:

1. The process of preparing cored laminates comprising placing hollow beads coated with a heat-tackifiable resin and a powdered metal between the confines of outer skins and heating and compressing to compact the beads and to gel the resin.

2. The process of claim 1 wherein the heat-tackifiable resin is a silicone resin.

3. The process of claim 1 wherein the heat-tackifiable resin is a phenolic resin.

4. The process of claim 1 wherein the heat-tackifiable resin is an epoxy resin.

5. The process of claim 1 wherein the heat-tackifiable resin is an alkyd resin.

6. The process of preparing cored laminates comprising placing hollow beads coated with a heat-tackifiable resin and a powdered metal between the confines of outer skins and heating and compressing to compact the beads and to gel the resin, said hollow beads being present in a proportion of 10 to 50% by weight, based on the weight of the binding resin and said powdered metal being present in a proportion of 3 to 50% by weight, based on the weight of the binding resin.

7. The process of preparing cored laminates comprising placing hollow beads coated with a heat-tackifiable resin and a powdered aluminum between the confines of outer skins and heating and compressing to compact the beads and to gel the resin, said hollow beads being present in a proportion of 15 to 50% by weight, based on the weight of the binding resin and said powdered aluminum being present in a proportion of 3 to 50% by weight, based on the weight of the binding resin.

8. The process of claim 1 comprising a multiplicity of cores confined by spaced-apart outer skins.

9. A cored sandwich structure comprised of at least two spaced-apart skins containing therebetween a cellular core comprised of thin walled beads coated with a powdered metal and a thermosetting resin, said resin and powdered metal completely filling the voids between the beads in order to connect the beads with each other and the spaced-apart skins to form a complete sandwich structure.

10. The product of claim 9 comprised of a multiplicity of cores confined by spaced-apart outer skins.

11. The product of claim 9 wherein the thermosetting resin is a silicone resin.

12. The product of claim 9 wherein the thermosetting resin is a phenolic resin.

13. The product of claim 9 wherein the thermosetting resin is an epoxy resin.

14. The product of claim 9 wherein the thermosetting resin is an alkyd resin.

15. A cored sandwich structure comprised of at least two spaced-apart skins containing there-between a cellular core comprised of thin walled beads coated with a powdered aluminum and a thermosetting resin, said resin and powdered aluminum completely filling the voids between the beads in order to connect the beads with each other and the spaced-apart skins to form a complete sandwich structure.

16. The process of preparing a filler comprising coating thin walled hollow beads with a powdered metal and a thermosetting resin.

17. The process of preparing a filler comprising coating thin walled hollow beads ranging in size from about 10 mesh to 250 mesh with a thermosetting resin, the proportion of beads to resin being about 10 to 50% by weight, based on the weight of the resin and about 3 to 50% by weight of a powdered metal, based on the weight of the resin.

18. The process of preparing a filler comprising coating thin walled hollow beads ranging in size from about 10 mesh to 250 mesh with a thermosetting silicone resin, the proportion of beads to resin being about 10 to 50% by weight, based on the weight of the resin and about 15 to 50% by weight of a powdered aluminum, based on the weight of the resin.

19. A filler comprised of thin walled hollow beads coated with and intermingled with powdered metal and a thermosetting resin.

20. A filler comprised of thin walled hollow beads coated with and intermingled with a thermosetting resin, said beads being present in a proportion of 10 to 50% by weight, based on the weight of said resin and a powdered metal, said powdered metal being present in a proportion of about 3 to 50% by weight, based on the weight of the thermosetting resin.

21. The product according to claim 20 wherein the thermosetting resin is a silicone resin.

22. The process of making a cored laminate including the steps of coating hollow beads with powdered metal, mixing and coating the metal coated beads with a thermosetting resin, placing the mixture between the confines of outer skins to form a laminate and applying heat and pressure to the laminate through the skins to effect the setting of the resin.

23. A cored laminate comprising hollow beads coated with powdered metal and a thermosetting resin confined by outer skins, the hollow metal coated beads being immobilized and spaced apart by the thermoset resin.

References Cited in the file of this patent

UNITED STATES PATENTS

| | | |
|---|---|---|
| 948,541 | Coleman | Feb. 8, 1910 |
| 2,110,470 | Morton | Mar. 8, 1938 |
| 2,553,759 | Geiger | May 22, 1951 |
| 2,639,252 | Simon et al. | May 19, 1953 |
| 2,676,892 | McLaughlin | Apr. 27, 1954 |

Notice of Adverse Decision in Interference

In Interference No. 91,102 involving Patent No. 2,806,509, F. A. Bozzacco and R. W. Sheatsley, Sandwich structures, final judgment adverse to the patentees was rendered May 11, 1962, as to claims 16 and 19.

[*Official Gazette June 26, 1962.*]